May 17, 1966      P. R. O'BRIEN      3,251,279

CYLINDER BLOCK AND METHOD FOR MANUFACTURING THE SAME

Filed July 20, 1962      9 Sheets-Sheet 1

INVENTOR.
PAUL R. O'BRIEN
BY Glenn, Palmer & Matthews
HIS ATTORNEYS

May 17, 1966 P. R. O'BRIEN 3,251,279
CYLINDER BLOCK AND METHOD FOR MANUFACTURING THE SAME
Filed July 20, 1962 9 Sheets-Sheet 2
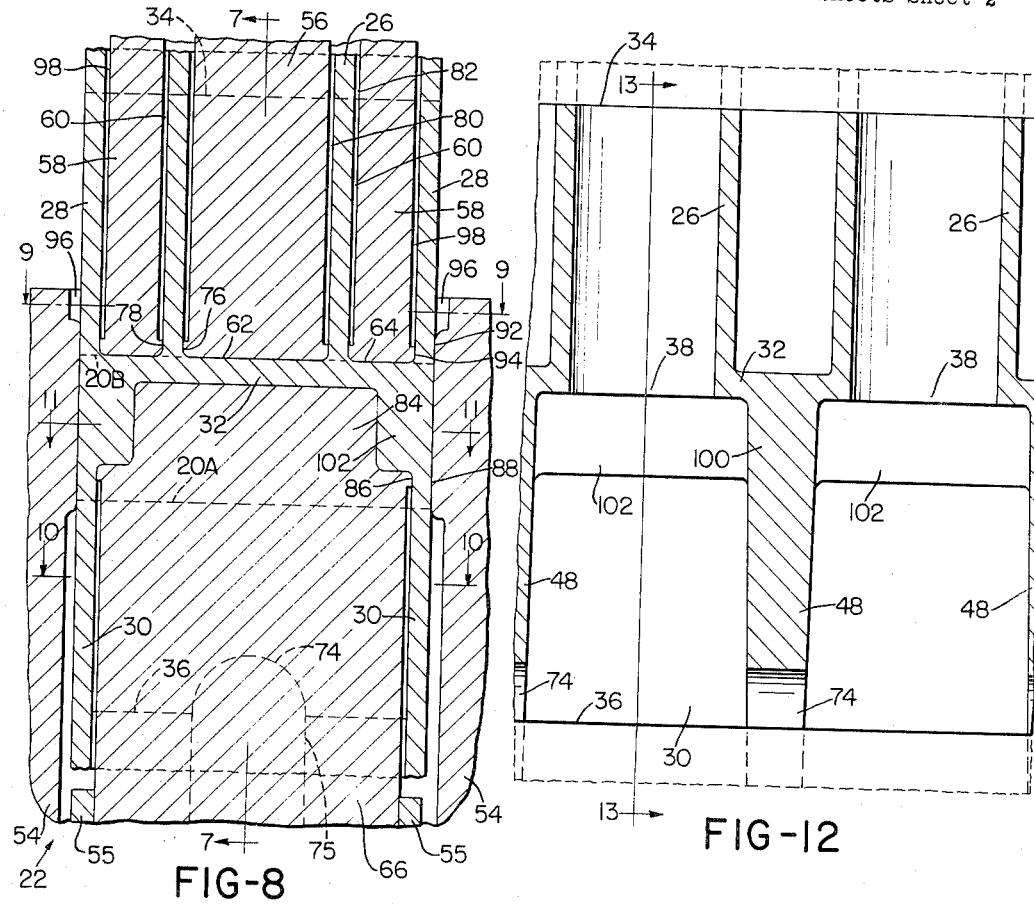
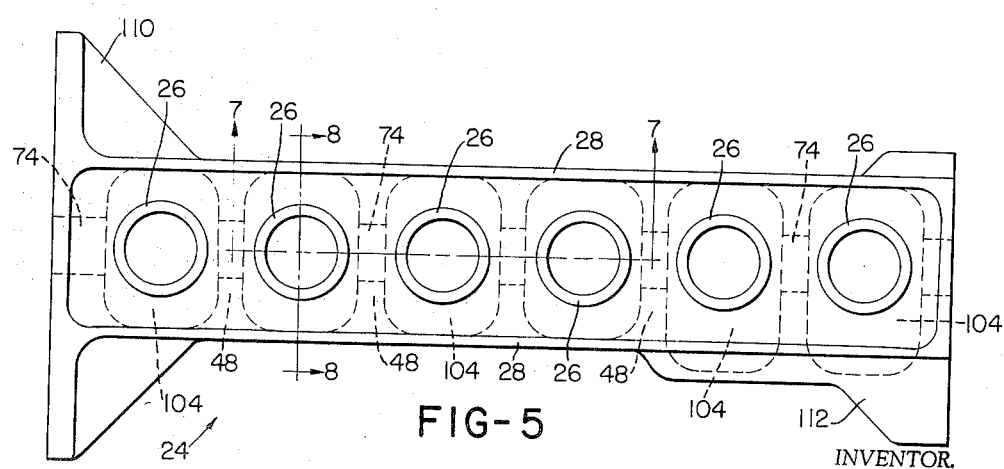
INVENTOR.
PAUL R. O'BRIEN
BY Glenn, Palmer
& Matthews
HIS ATTORNEYS May 17, 1966     P. R. O'BRIEN     3,251,279
CYLINDER BLOCK AND METHOD FOR MANUFACTURING THE SAME
Filed July 20, 1962     9 Sheets-Sheet 3

INVENTOR.
PAUL R. O'BRIEN
BY Glenn, Palmer & Matthews
HIS ATTORNEYS

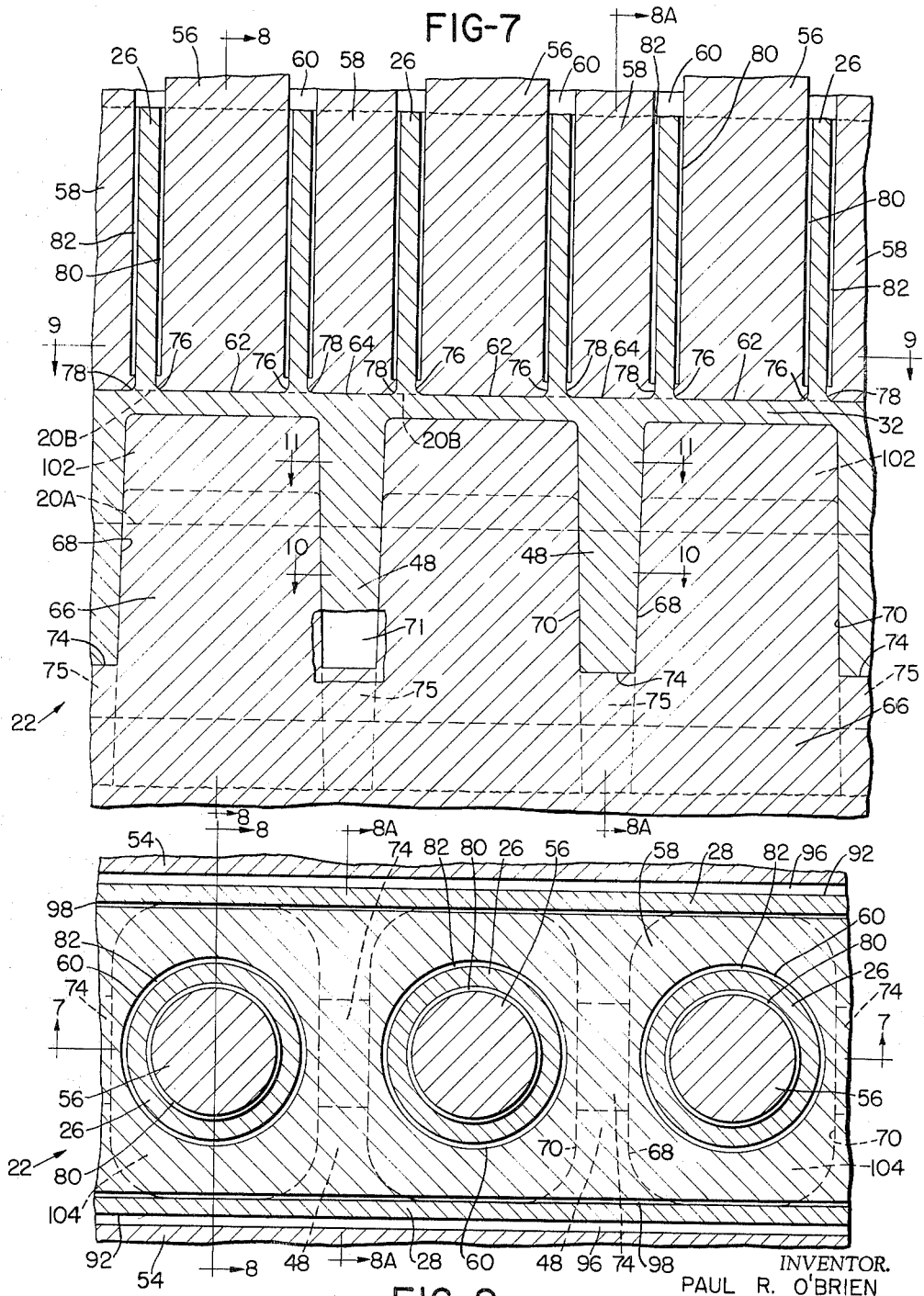

May 17, 1966 P. R. O'BRIEN 3,251,279
CYLINDER BLOCK AND METHOD FOR MANUFACTURING THE SAME
Filed July 20, 1962 9 Sheets-Sheet 5

INVENTOR.
PAUL R. O'BRIEN
BY Glenn, Palmer & Matthews
HIS ATTORNEYS

May 17, 1966 P. R. O'BRIEN 3,251,279
CYLINDER BLOCK AND METHOD FOR MANUFACTURING THE SAME
Filed July 20, 1962 9 Sheets-Sheet 7
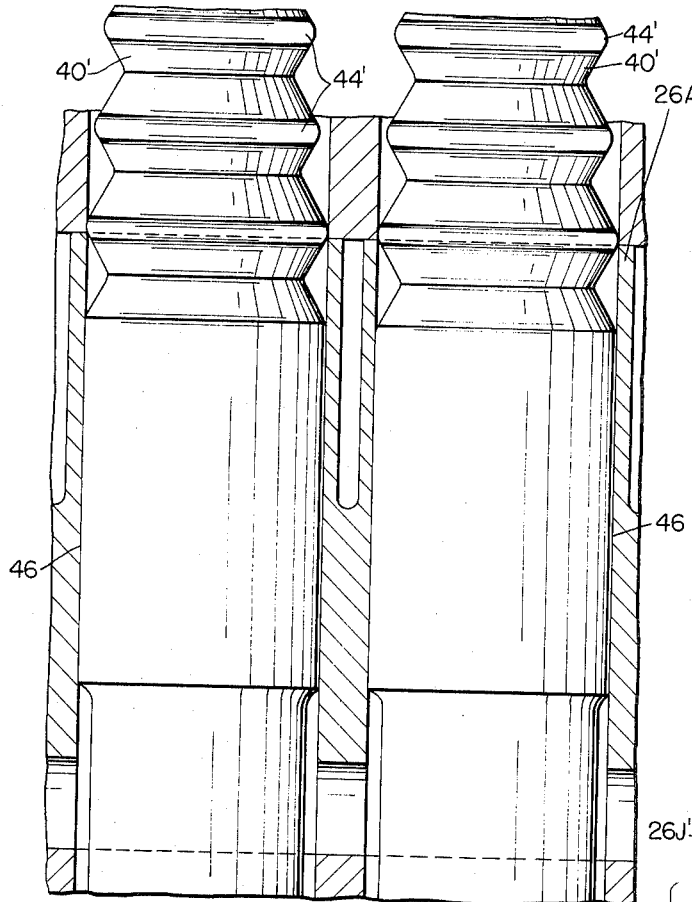
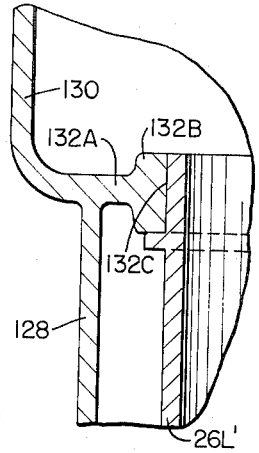
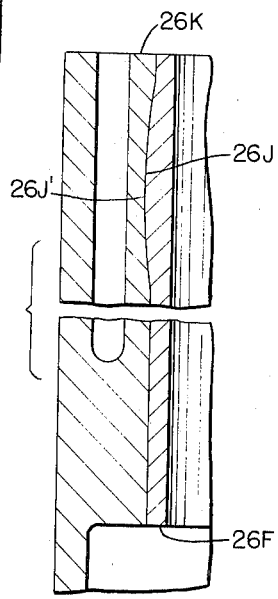
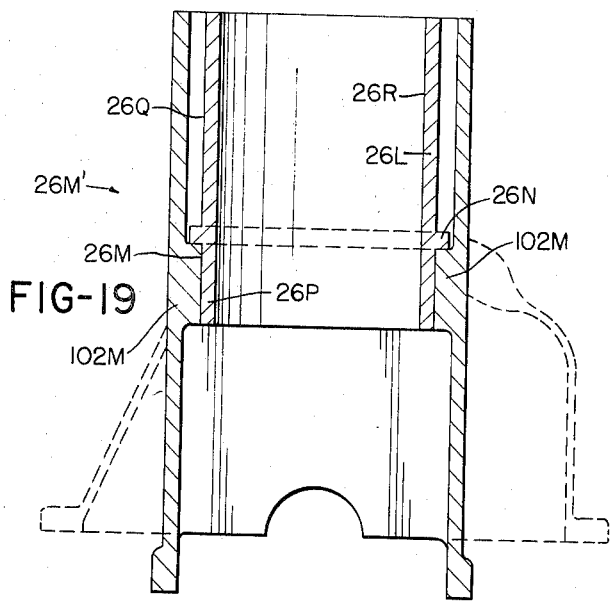
INVENTOR.
PAUL R. O'BRIEN
BY Glenn, Palmer
& Matthews
HIS ATTORNEYS May 17, 1966        P. R. O'BRIEN        3,251,279
CYLINDER BLOCK AND METHOD FOR MANUFACTURING THE SAME
Filed July 20, 1962        9 Sheets-Sheet 9

INVENTOR.
PAUL R. O'BRIEN
BY Glenn, Palmer
& Matthews
HIS ATTORNEYS

United States Patent Office 3,251,279
Patented May 17, 1966

3,251,279
CYLINDER BLOCK AND METHOD FOR
MANUFACTURING THE SAME
Paul R. O'Brien, Anchorage, Ky., assignor to Reynolds
Metals Corporation, Richmond, Va., a corporation of
Delaware
Filed July 20, 1962, Ser. No. 211,204
31 Claims. (Cl. 92—144)

This invention is directed to the production of an engine or cylinder block and the like from a billet or mass of compressible or extrudable material, such as aluminous metal and the like.

One feature of this invention relates to the extrusion or compression of cylinder and cooling jacket walls or wall constructions in one direction and crankcase walls or wall constructions in the opposite direction from a mass of compressible or extrudable material, such as an aluminous metal billet, and the like.

According to another feature, the product of the immediately preceding feature also has an intermediate wall formed with said cylinder and cooling jacket walls on one side and said crankcase walls on the other side of said intermediate wall respectively.

The cooling jacket walls and the crankcase walls may be aligned with or adjacent to each other when they are oppositely compressed or extruded.

The walls above described may be simultaneously extruded or compressed.

Another feature of this invention includes the simultaneous formation of one or more crankshaft bearing walls transverse to said crankcase walls.

Another feature of this invention involves the compression of an extrudable mass and the formation of one or more cylinder walls from such mass.

Thereafter such cylindrical wall or walls may be outwardly spread to form a cylindrical wall or walls of larger diameter.

A crankcase construction may also be simultaneously formed adjacent said cylinder wall or walls.

A cooling jacket wall or cooling wall construction may also be simultaneously formed outside said cylinder wall or walls.

Another feature of this invention includes a cylinder block which has a cylinder wall formed by compressing a mass of a compressible metal and the like, such as an aluminous metal.

Another feature of this invention includes apparatus for constructing a cylinder block according to the immediately preceding feature.

Another feature of this invention includes a cylinder block which has a cylinder wall and a cooling jacket wall construction outside said cylinder wall formed by compressing a mass of a compressible metal and the like, such as an aluminous metal.

Another feature of this invention includes apparatus for constructing a cylinder block according to the immediately preceding feature.

Another feature of this invention includes a cylinder block which has a cylinder wall construction and an adjacent crankcase wall construction formed by compressing a mass of a compressible metal and the like, such as an aluminous metal.

Another feature of this invention includes apparatus for constructing a cylinder block according to the immediately preceding feature.

Another feature of this invention includes a method, apparatus, and product in which a mass or billet of compressible metal and the like, such as an aluminous metal, is compressed to form cylinder and cooling jacket constructions on one side of an intermediate wall and a crankcase wall construction on the opposite side of said transverse wall, thereafter piercing the transverse wall, and thereafter outwardly spreading said cylinder wall construction to produce a larger internal diameter cylinder wall construction.

A cylinder block generated by this method may also use a cylinder wall of other material such as cast iron, high silicon aluminum alloy, or other suitable metallic material which can be pressed into the transverse wall which has had openings formed therein.

Also cast iron, high silicon aluminum alloy, or other suitable metallic material liners may be swedged or forged into aluminum outer sleeves.

Many of the features of this invention are applicable to cylinder blocks made of other metals besides aluminous metals.

Thereafter, if desired, said crankcase wall construction may be outwardly flared.

The material for the metallic mass, billet and the like may be an aluminum material, such as an aluminum alloy selected from a class of alloys known as the wrought aluminum alloys, such as wrought aluminum alloys, Nos. 6061, 6062, 6463, 2014, 2024, and 5086, or 70 series alloys, such as No. 7079, etc., which are worked or formed according to this invention with relative ease and efficiency to produce a cylinder block of this invention.

The billet may have a substantially flat shape and its periphery may have the shape of the extrusion, being slightly smaller than the smallest transverse extent of the extrusion to fit in the press construction.

Such billets or masses may be made from aluminum alloys which, when properly worked or wrought, produce the wrought aluminum alloys known in the aluminum industry, for example, as Nos. 6062–T62, 6061–T62, 2014–T4, 2024–T4, or other similar alloys in the 20, 50, 60 or 70 series or their equivalents.

The mass or billet of this character may be heated uniformly throughout its body to a temperature to produce internal self-weldabiilty to prevent fracture of the metal during subsequent hot temperature formations. Such temperatures preferably are above the re-crystallization temperature. Where wrought aluminum alloys Nos. 6062, 6061, 2014, and 2024 and the like are used, the initial temperature and subsequent forming temperatures preferably are from about 750° F. to 850° F. with a maximum temperature of about 1100° F. The heated billet or mass is subjected to one or more high energy loading formations.

With the specific engine or cylinder block formation herein disclosed, the extrusion or compression stroke may be in the order of 360 inches to 1500 inches per minute, punch speed, with a pressure of from 25,000 to 350,000 p.s.i., with 50,000 p.s.i. being now found to be suitable. The punch strokes may be as much as 15 inches in length, with a 4000 to 6000 ton single action press.

The dies and punches may be made of hardened tool steel or cast iron, but preferably of steel suitable for press forming as herein used. The die and punch temperatures may be in the order of about 250° F. to 450° F.

The procedure is regulated to produce a finished engine or cylinder block, for example, with the conditions or characteristics substantially of 6062–T62, 6061–T62, 2014–T4, and 2024–T4, 7079–T62, or their equivalents.

The wrought aluminum alloy product achieved by this invention has superior physical properties, such as superior tensile and yield strength, fatigue strength, and higher elongation properties compared to aluminum cast engine or cylinder blocks. For example, a cast aluminum block has approximately 25,000 p.s.i. maximum yield strength with 2% elongation, whereas a wrought aluminum block of this invention has 45,000 p.s.i. yield strength and 13% elongation. This permits great section thickness reductions and corresponding cost savings. This prevent fracturing under low or high loading conditions.

The method and apparatus of this invention eliminate practically all rough machining operations and scrap, during process, compared to a cast machined block, the machining of which produces a large amount of scrap turnings.

Many of the features of this invention are applicable to products other than the block construction herein disclosed.

Accordingly, an object of this invention is to provide a novel product, such as an engine or cylinder block formation, having one or more of the features of the invention herein disclosed.

Another object of this invention is to provide methods of making the product, such as an engine or cylinder block formation and the like, having one or more of the features of the invention herein disclosed.

Another object of this invention is to provide apparatus for making novel products, such as engine or cylinder block formations and having one or more of the features of the invention herein disclosed.

Further, objects of this invention are apparent from this description, the appended claims and/or the accompanying drawings in which:

FIGURE 5 is a top view, looking downwardly, of a typical product of the extrusion step.

FIGURE 7 is a cross section along line 7—7 of FIGURES 5, 8 and 9.

FIGURE 8 is a cross section along line 8—8 of FIGURES 5, 7 and 9.

FIGURE 9 is a cross section along line 9—9 of FIGURES 7 and 8.

FIGURE 12 is a cross section of part of the product shown in FIGURE 7 after it has been trimmed at the top and bottom, the trimmed part being shown in dotted lines, and after it has been pierced at the bottom of the cylinder.

FIGURE 14A is a view similar to a portion of FIGURE 14, but showing another embodiment of the cylinder expanding and burnishing step.

FIGURE 19 is a cross section similar to a portion of FIGURE 16 but showing the use of press fit sleeves in the cylinder block.

FIGURE 20 is a view similar to a portion of FIGURE 18, but showing the use of press fit sleeves in the cylinder block.

FIGURE 21 is a view similar to a portion of FIGURE 16 but showing another embodiment of inserted sleeve construction wherein a sleeve lining construction is inserted in an extruded cylinder wall construction.

Figure 1:
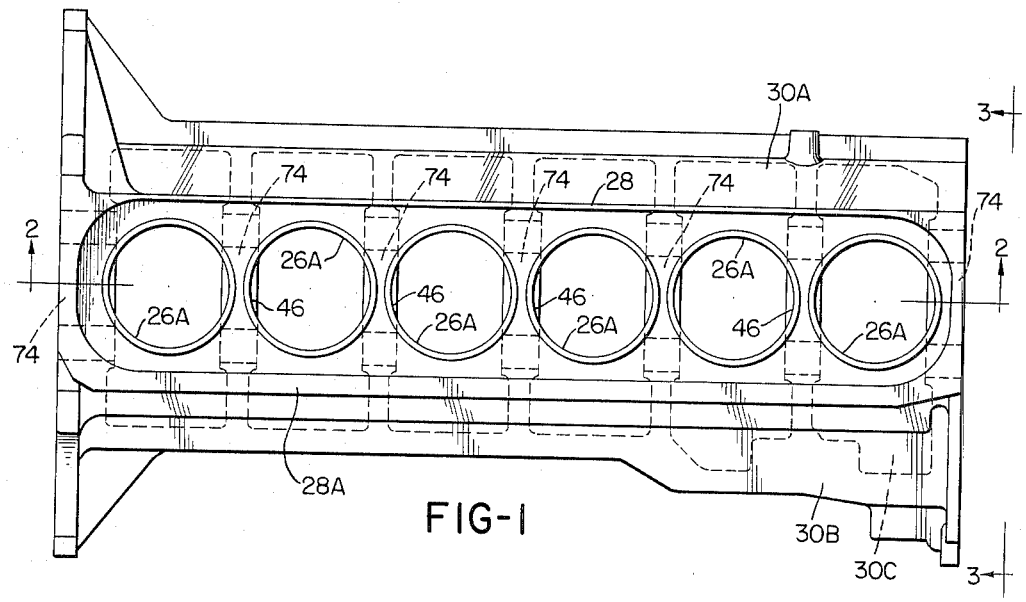
FIGURE 1 is a top view of a typical finished engine or cylinder block.

Certain words, such as adjectives describing direction, relative position, etc., are used in this application for the sake of brevity and clearness. However, these words are applied to the specific directions and relative positions, etc., shown in the drawings, and it is to be understood that such directions, relative positions, etc., may be entirely different in the actual products, methods, and machines in actual use.

Figures 3, 4:
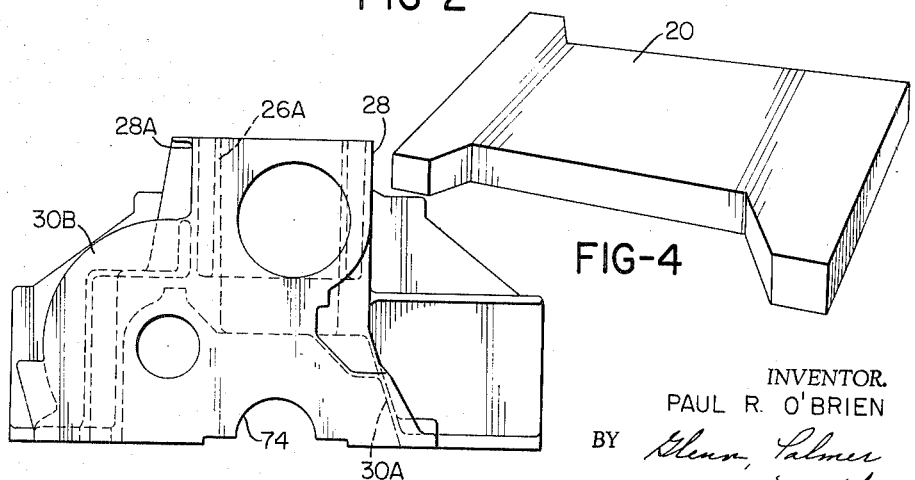
FIGURE 3 is an end view from line 3 of FIGURE 1.
FIGURE 4 is a perspective view of a typical billet for the extrusion step in the formation of the cylinder block.
Figure 6:
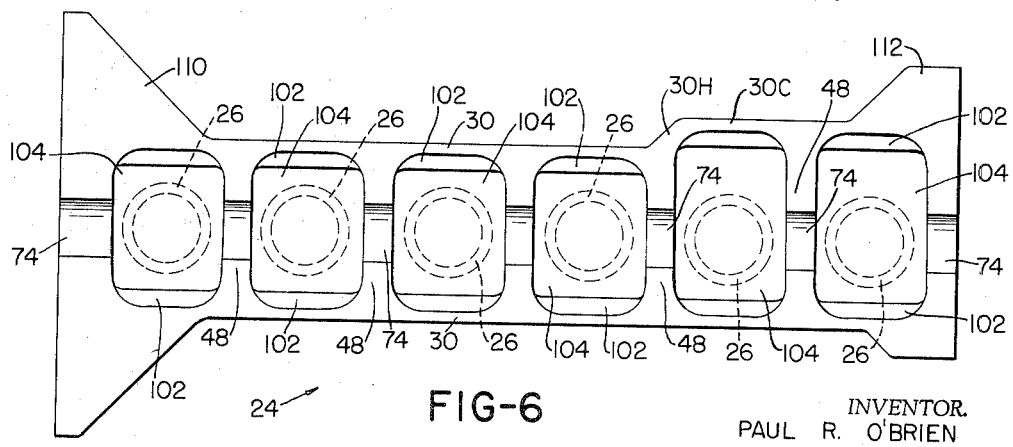
FIGURE 6 is a bottom view, looking upwardly, of the product shown in FIGURE 5.
Figure 10:
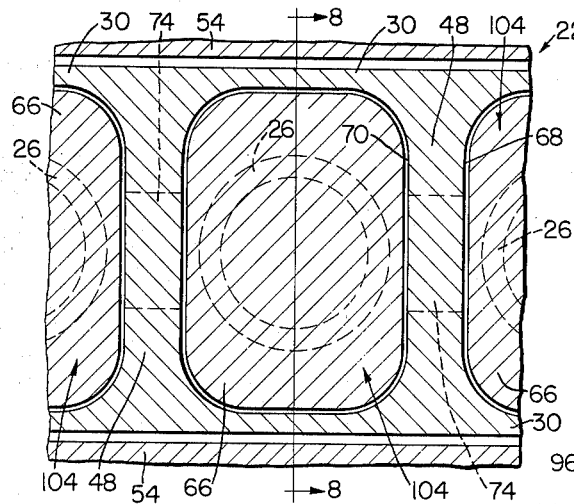
FIGURE 10 is a cross section along line 10—10 of part of FIGURES 7 and 8.
Figure 11:
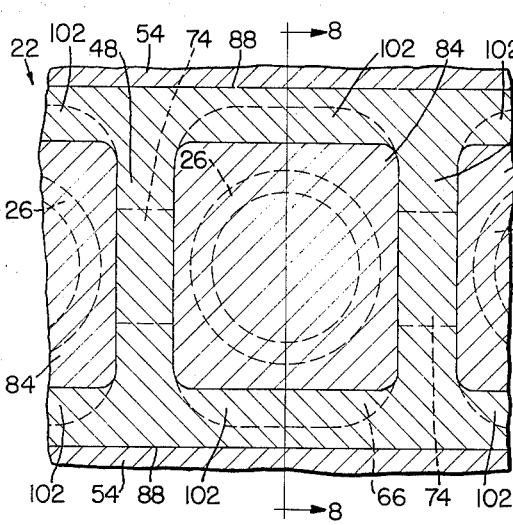
FIGURE 11 is a cross section along line 11—11 of FIGURES 7 and 8.

An engine or cylinder block, and the like, according to this invention may be made by compressing a compressible or extrudable mass such as an aluminous metal mass or billet 20, FIGURE 4, in an extruding press 22 such as shown in FIGURES 7 to 11 inclusive. The billet 20 may be at a temperature such as 750° F. to 800° F., and the press may operate under conditions, speeds, etc., as elsewhere described. The operation of the press 22 may produce a product 24 substantially as shown in FIGURES 5 and 6, which may have details as shown in FIGURES 7 through 11.

The billet 20 may be produced in substantially flat condition and may have a side contour to provide the required metal for the press. For example, it may have the shape of the extrusion and may be slightly smaller than the smallest transverse extent of the extrusion.

The billet may be blanked out of metal sheet material or it may be made of compressed granulated metal. The billet is scalped and all sides before introduction into the press 22.

The press 22 may be used with the parts and the product in the relative positions shown in FIGURES 7-11. However, the press parts and the product of FIGURES 7-11 may be used in the inverted positions shown in the press 22A of FIGURE 17, it being understood that the remainder of the parts of the press 22A and the product of FIGURE 17 may be substantially the same as in FIGURES 7-11 with their press parts and product inverted to correspond to the inverted positions of FIGURE 17. Hence other views of the press and product of FIGURE 17, corresponding to FIGURES 7 and 9-11 in inverted position are not shown.

Figure 17:
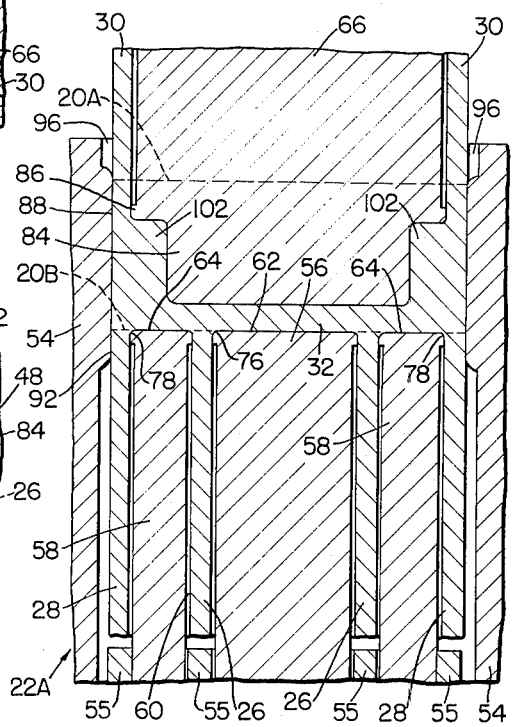
FIGURE 17 is a cross section similar to a portion of FIGURE 8, but showing the parts in inverted positions.

Substantially all of the parts of FIGURE 17 are indicated by the same reference numerals as in FIGURES 7-11 for the sake of brevity, since they are substantially identical except for their inverted position.

The presses 22 or 22A may extrude preliminary cylinder walls 26 and cooling jacket walls 28 in one direction and crankcase walls 30 in another or opposite direction with an intermediate wall 32 having walls 26 and 28 on one side and the walls 30 on the opposite side of such intermediate wall 32.

Thereafter, the preliminary cylinder walls 26 of FIGURES 5-12 may be outwardly spread to produce cylinder walls 26A of FIGURES 1, 2, and 13-16 which have larger diameters than the original or preliminary cylinder walls 26. If desired, the cooling jacket walls 28 need not be changed in lateral extent while the cylinder walls are being outwardly spread.

Figure 8A:
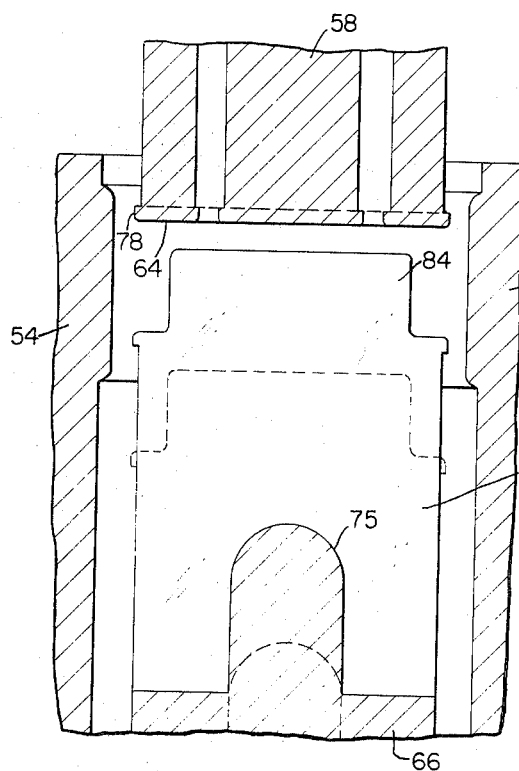
FIGURE 8A is a cross section along lines 8A—8A of FIGURES 7 and 9.
Figure 13:
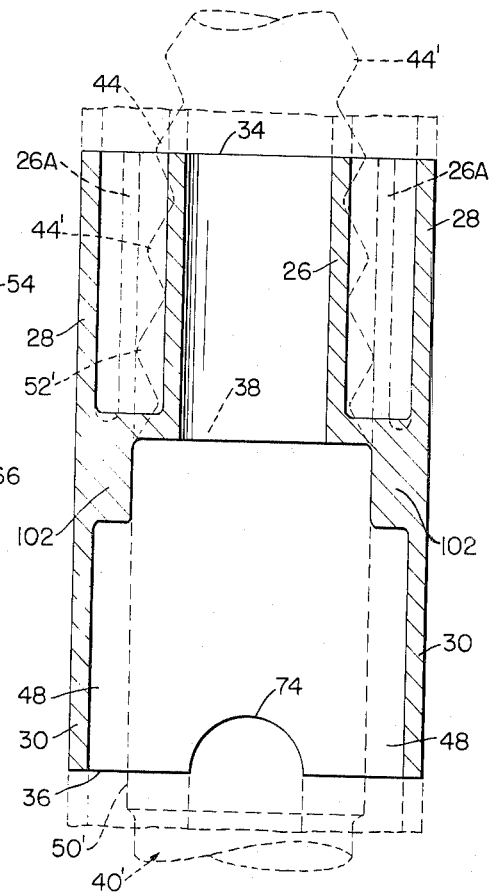
FIGURE 13 is a cross section along the line 13—13 of FIGURE 12 and also showing the product of FIGURE 8 after it has been trimmed and punched and also showing in dotted lines the cylinder expanding and burnishing step to be performed in FIGURE 14A.

After the extruding operation in press 22 or 22A and preferably before the cylinder spreading or crankcase wall flaring operations elsewhere described, the cylinder walls 26 and the cooling jacket walls 28 may have their ends trimmed, such as indicated on the trim line 34 and the trim line 36 in FIGURES 8 and 12. FIGURES 12 and 13 show the product of FIGURES 8 and 7 trimmed at 34 and 36, and in addition, shows the intermediate wall 32 pierced at 38 in alignment with the initial cylinder walls 26 ready for the cylinder spreading operation which takes place as shown in FIGURES 13, 14, 14A, 15, and 16.

Figure 14:
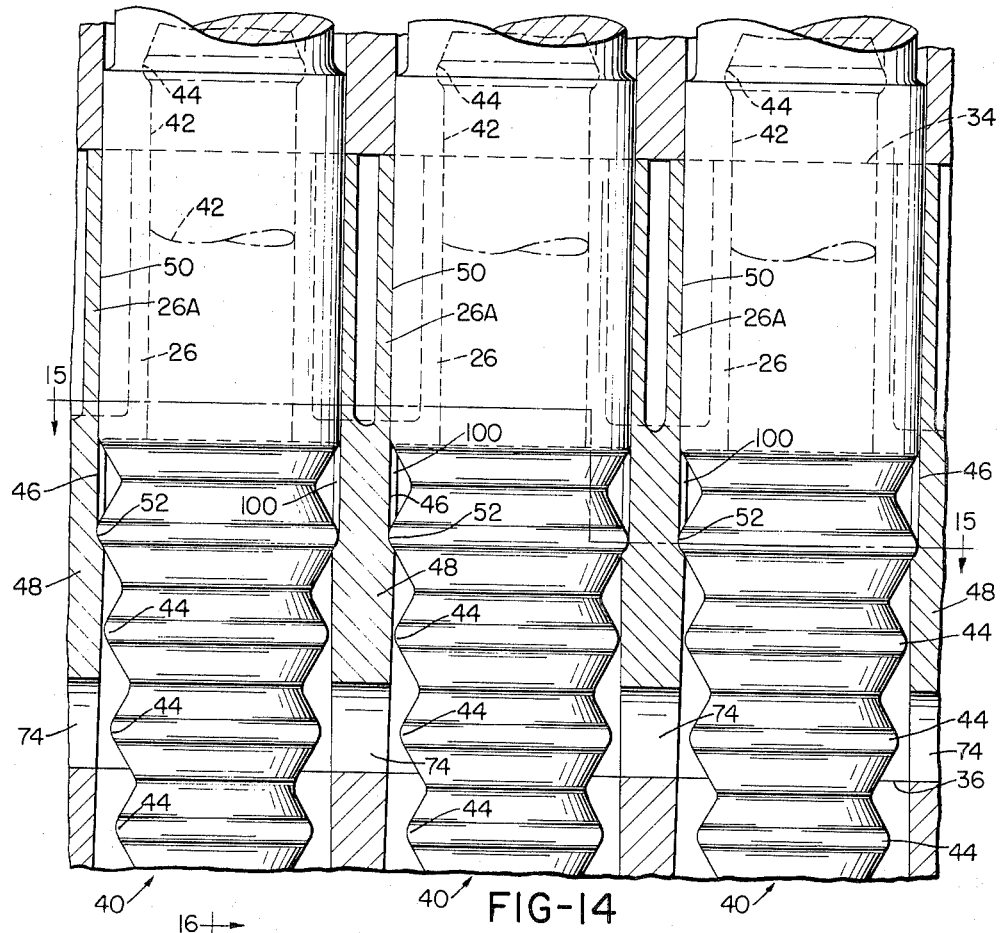
FIGURE 14 is a cross section of the trimmed and punched product of FIGURES 7 and 12 at the completion of one embodiment of the cylinder expanding and burnishing step.
Figure 15:
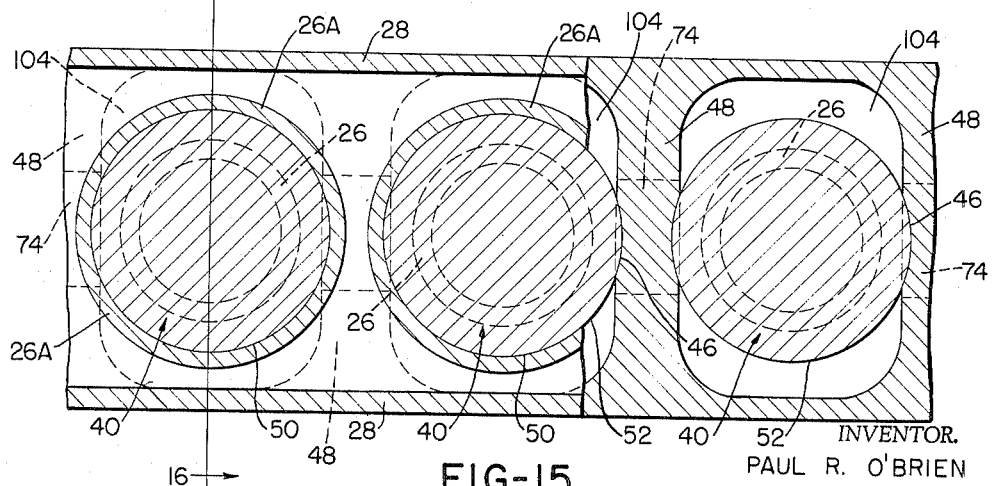
FIGURE 15 is a cross section of the product of FIGURE 14 along the line 15—15 of FIGURE 14.
Figure 16:
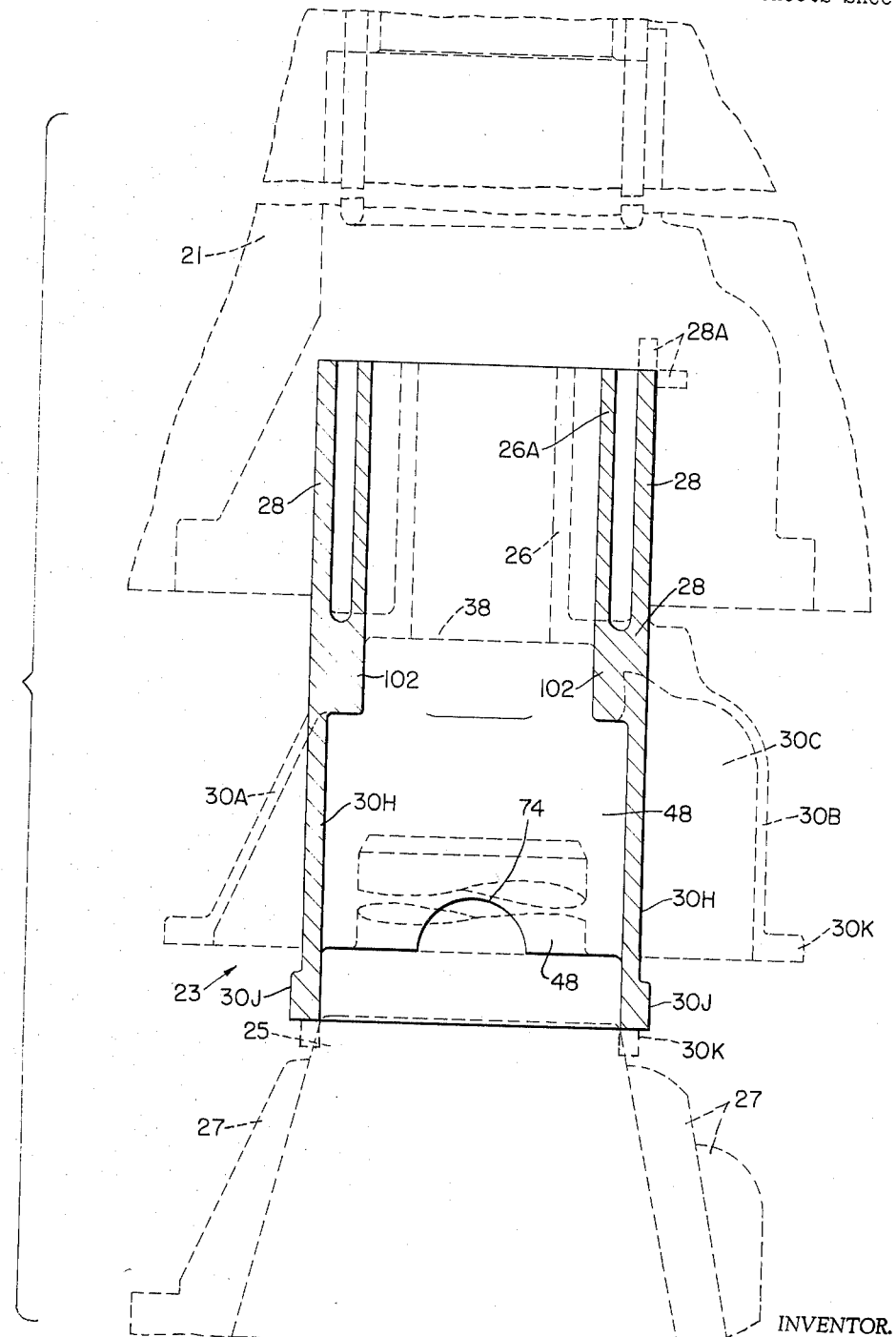
FIGURE 16 is a cross section along line 16—16 of FIGURE 15 and indicating the product of the operation of FIGURES 14 and 15.

The spreading operation of the cylinder walls 26 may be accomplished by the piercing operation 38, which is shown in FIGURES 12 and 13. After the piercing operation is completed, the cylinder walls 26 are outwardly spread, as shown in dotted lines in FIGURE 13 and in full lines in FIGURES 14–16, and 14A. FIGURE 14 shows one embodiment of burnishing or broach-like tool, or set of tools 40, each of which has an entering cylindrical construction or pull rod construction shown in dotted lines 42, FIGURE 14, which is inserted in unexpanded cylinder walls 26, which are shown in dotted lines in FIGURE 14. The tool or tools 40 may have a series of burnishing buttons or bands 44 of increasing diameter, such as by $\frac{1}{16}$ inch increments, gradually to expand the walls 26 from the dotted line condition in FIGURES 14–16 to the final full line expanded construction 26A which is shown in FIGURES 14–16. If desired, in addition, the tool or tools 40 may expand the portions 46 of the crankshaft bearing supporting walls 48 which were produced at the same time that the cylinder walls 26, the jacket walls 28 and the crankcase walls 30 were produced. This spreading or burnishing operation produces the new cylinder walls 26A, of increased diameter, when the final cylindrical wall 50 of the tool 40 enters the cylindrical walls 26. If desired, the next to the last burnishing surface 52 may be of the same diameter as the wall 50, and is used to spread the portions 46 of the walls 48. The portions 46 permit downward movement of the pistons of the engine or the like, not shown.

Referring now to FIGURES 7 through 13 and 17, the press 22 (or 22A of FIGURE 17) may have an outer die 54, which receives the billet 20 in the position indicated by the dotted lines 20A and 20B in FIGURES 7, 8, and 17. In actual operation, it may be preferred to have the press shown in FIGURES 7, 8, and 9 operated with the parts upside down from the positions actually shown in FIGURES 7, 8, and 9, as shown in FIGURE 17. The parts in FIGURES 7–11 are shown in positions which correspond to other FIGURES 12–16, etc., so the relationship of the parts become evident. However, the positions of FIGURE 17 may be preferred for ease of placement of billet 20, etc.

A plurality of cylindrical punches 56 are surrounded by an extruding punch or die 58 which has a plurality of circular openings 60 which surround the cylindrical punches 56. When the parts of FIGURES 7, 8, and 9 are placed upside down, as shown in FIGURE 17, the extruding dies or punches 56 and 58 have horizontal surfaces 62 and 64 which support the billet 20 at a time when the crankcase punch 66 is withdrawn away from the positions shown in FIGURES 7, 8, and 17.

The punch 66 has a plurality of transverse surfaces 68 and 70, FIGURES 7 and 9, which form a plurality of transverse tapering grooves 71, broken out in FIGURE 7, which will form the crankcase bearing walls 48 which have crankshaft bearing arches 74. The punch 66 has arch producing walls 75 in the grooves 71 which produce the crankshaft bearing arches 74.

The stationary cylindrical extruding punches or dies 56 have extruding lips 76, FIGURE 7, which cooperate with the circular extruding lips 78. These lips cooperate with each other to extrude the cylinders 26. The lips 76 and 78 make the cylindrical walls 26 of sufficient narrowness so that the friction relieving spaces 80 and 82 are provided between the walls 26 and the punches or dies 56 and 58, so friction is avoided during the extrusion of the walls 26.

The crankcase punch 66 has a punching head 84, FIGURE 8, which initially punches the billet as the punch 66 strikes the billet. In addition, the punch 66 has an extruding lip 86 which cooperates with the lip portion 88 of the outer die 54. The outer die 54 also has another lip portion 92 which cooperates with a lip portion 94 of the punch 58 to produce the cooling jacket walls 28. A space 96 is provided above the lip portion 92 to reduce the friction during the passage of the wall 28. A corresponding frictionless space 98 is provided to reduce the friction or prevent the friction between the cooling cylinder or jacket walls 28 and the punch 58.

In this manner it is to be seen that the cylinder walls 26, the cooling jacket walls 28, and the crankcase walls 30 are all extruded by adjacent lips 76, 78, 86, 88, 92, and 94, which are sufficiently long to form the extruded walls 26, 28, and 30 but then terminate and prevent any further friction against these walls so that a true extrusion of these walls is performed.

Strippers 55 are provided to strip the product from the punch 66 in FIGURES 7–11, and from punches 56 and 58 and dies 54 in FIGURE 17.

In FIGURE 17, the dies 54, and punches 56 and 58 are stationary during the extruding operation, and the punch 66 is movable upward from the position shown in FIGURE 17. If desired, during the stripping operation the die 54 and the strippers 55 are movable upward enough to strip the product from punches 56 and 58. Thereafter, the dies 54 may be stopped and the strippers 55 are movable farther to strip the product from the dies 54.

To place the billet in the press 22A of FIGURE 17, the punch 66 is lifted to a loading position. Then the billet is laid on the stationary surfaces 62 and 64 so the billet upper surface extends up, for example, to dotted line 20A. The billet 20 previously has been scalped or etched on all sides. It is then heated by induction heaters, for example, to 750° F., more or less, and quenched in hot oil to 150° F. and aged. Thereafter, the billet may be heated by induction heating to a temperature of 750° F. and inserted in the jacket wall dies 54 with the billet under surfaces resting on surfaces 62 and 64 and with the upper surface extending, for example, to dotted line 20A, while the punch 66 is in its upper postion. Then the punch 66 strikes down at the speeds herein given, and the walls 26, 28 and 30 are extruded to produce the crankcase walls 30 at the top and the cylinders 26 and cooling jacket walls 28 at the bottom.

The product of FIGURE 17 may then be stripped from the press by upward movement of the punch 66, dies 54 and further movement of strippers 55.

The product of FIGURE 17 may then be inverted, if desired, and the operations of FIGURES 12–16 may then be performed on it with any reheating operations that may be required, and with final quenching and artificial aging that may be required.

The punch 66 and the punch head 84 form a thick band 100, 102 at the upper part of the crankcase, and provide crank spaces 104 in which the cranks can rotate.

The crankshaft walls 30 may be flared outwardly by a suitable punch and die construction 21, 25, 27, etc., capable of producing this outward flaring construction to produce walls 30A and 30B of FIGURE 16. This produces a sufficiently wide crankcase space for the rotation of the crankshaft and for the placement of the necessary valve cam shaft, etc.

For example, in FIGURE 16, one or more dies 21 may be provided to receive the product 23 of the operations of FIGURE 14–16, elsewhere described. Also one or more punches 25 and 27 may be provided to produce one or more outward flaring actions on the crankcase walls 30 to produce the outwardly flared crankcase walls 30A and 30B. Punch 25 may produce an initial flare and punch 27 may produce a subsequent flare.

The flaring operation or operations diagrammatically shown in FIGURE 16 may be performed either before, simultaneously with, or after the operation performed according to FIGURES 12–15 and the full line operation of FIGURE 16, elsewhere described.

Figure 2:
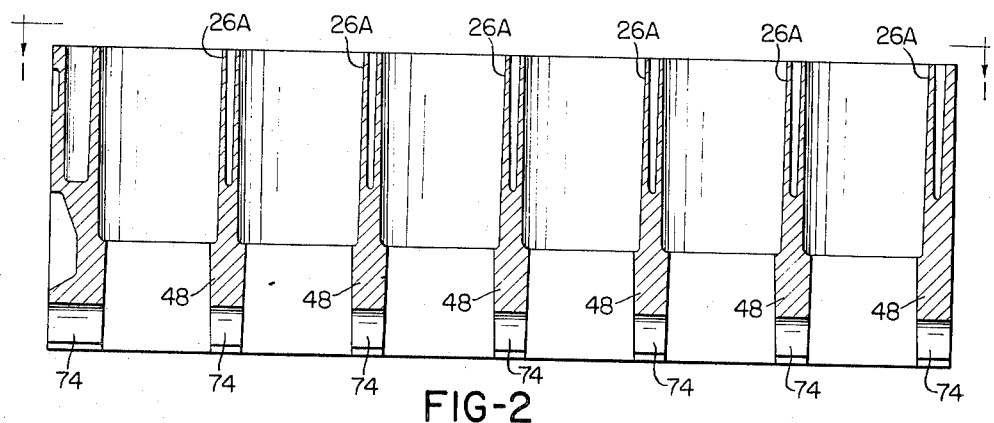
FIGURE 2 is a cross section along line 2—2 of FIGURE 1.

The flaring operation may produce a cylinder block substantially as shown in FIGURES 1, 2, and 3.

In FIGURES 1, 2, and 3, the cylinders 26A may be the same as the cylinders 26A of FIGURES 13–16. The jacket wall 28, FIGURE 1, is the same as one of the jacket walls 28 of FIGURES 13–16. The jacket wall 28A of FIGURE 1 may be a sidewise bead 28A of FIGURE 16 in which the original right hand jacket wall 28 was not trimmed and was upset sidewise after the flaring operation of FIGURE 16.

The end walls 110 and 112 of the cylinder block of FIGURES 5 and 6 are produced by extruding operations similar to the side wall operations and are produced at the same time.

A wider crankshaft wall portion 30C which may be produced by outwardly slanting the side wall portions 30H, is shown in FIGURE 16. These portions 110, 112, 30C and 30H may be outwardly flared and otherwise acted upon by any desirable punch and die construction of the character herein described to produce the general wall construction shown in FIGURES 1 and 2.

Figure 18:
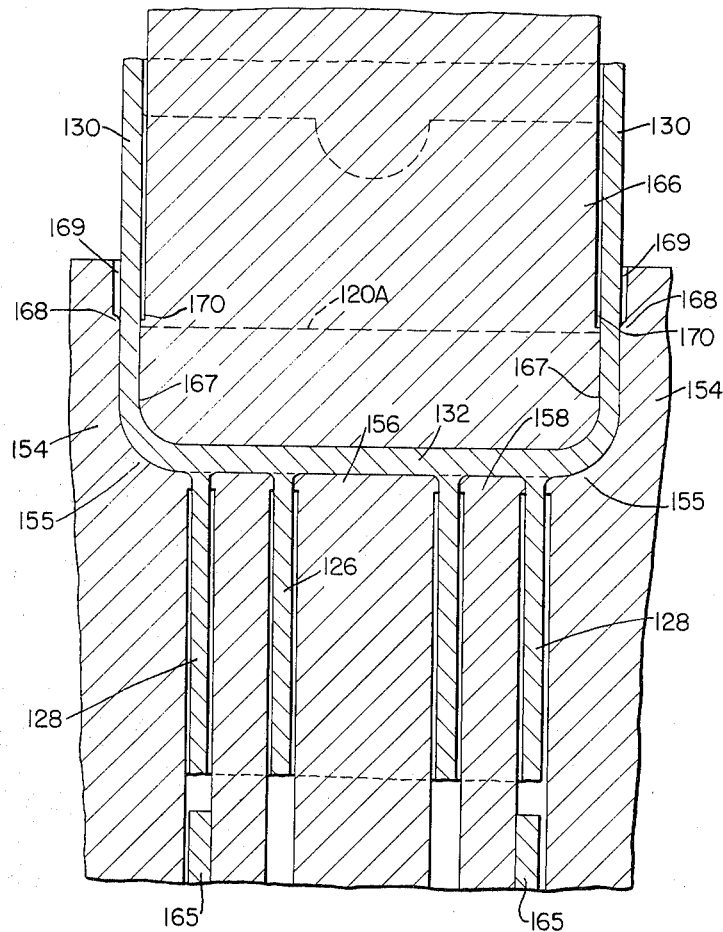
FIGURE 18 is a cross section of part of another embodiment of a press and product somewhat similar to that shown in FIGURE 17.

FIGURE 18 shows another embodiment in which crankcase walls 130 are made farther apart than the cooling jacket wall constructions 128, so the crankcase walls 130 need not be flared as in FIGURE 16. Instead, the punch 66 of FIGURE 17 may be made wider, as shown at 166 in FIGURE 18. Likewise the outer die members 54 of FIGURE 17 may be made farther apart, as at 154 in FIGURE 18. The jacket walls 28, and the cylinder walls 26 of FIGURE 17 may be made substantially the same as indicated at 126 and 128 in FIGURE 18. The outer die members 154 of FIGURE 18 may have inward offsets 155 so the cylinder walls 126 and the jacket walls 128 of FIGURE 18 may be substantially of the same lateral dimensions as the cylinder walls 26 and jacket walls 28 of FIGURE 17 while permitting the crankcase walls 130 of FIGURE 18 to be farther apart than the crankcase walls 30 of FIGURE 17. The intermediate wall 132 of FIGURE 18 may also be wider than the wall 32 of FIGURE 17.

The stationary punches or dies 156 and 158 of FIGURE 18 may be identical with the stationary punches or dies 56 and 58 of FIGURE 17.

In this manner a wider crankcase is produced in FIGURE 18 which is wide enough to permit rotation of the crankcase therein without outwardly flaring the crankcase walls 130.

Strippers 165 in FIGURE 18 are movable upward with the dies 154, for example, to strip the product from the members 156 and 158. The strippers 155 may strip the product from the dies 154 by further upward movement of the strippers 155 after the dies 154 stop.

The punch 166 may have extruding lips at 167, and the die members 154 may have extruding lips at 168 to provide non-frictional vacancies at 169 and 170.

The billet may be placed on the members 155, 156, and 158 when the punch 166 is raised. The billet may extend from the upper surfaces of members 155, 156, and 158 up to the dotted line 120A and may fit in the die 154.

In the operation of this invention, the billet or mass 20 may be blanked from proper aluminous metal sheet, such as of the aluminous alloys elsewhere described, or may be pressed from granulated aluminous particles, for example, of 200x to 300x. The billet may then be scalped or etched on all sides, then heated, for example, to 750° F. and quenched in hot oil at 150° F. Then the billet or mass 20 may be placed in any of the extruding presses of FIGURES 7–11, 17 or 18 to form products substantially as shown in these figures. The products may then be stripped from the respective presses.

The intermediate walls 32 and 132 may be punched as shown at 38 in FIGURES 12 and 13, and then the cylinder walls 26 and 126 may be spread outwardly as shown in FIGURES 14–16.

Thereafter, if the crankcase walls 30 of FIGURES 7–11 and 17 are not far enough apart, the products of FIGURES 7–11 and 17 may have their crankcase walls 30 outwardly flared as indicated in FIGURE 16 to produce a cylinder block as shown in FIGURES 1 and 2.

The product of FIGURE 18 may have its cylinder walls 126 outwardly spread, as in FIGURES 13–16, but it need not have its crankcase walls 130 outwardly flared, as shown in FIGURE 16 since the walls 130 may be far enough apart to accept the normal rotation of a crankshaft.

The products as they progress beyond the stages of FIGURES 7–11, 17, and 18 may be reheated above the recrystallization temperature as often as required. After final working of the products, they may be reheated if not sufficiently hot, and may then be quenched and artifically aged as desired.

Thereafter, the products may have any required holes pierced etc. and may be cleaned, etched and rinsed as desired.

The walls 30H of FIGURE 16 may be initially thickened at their lower ends 30J in a suitable press so there will be metal available to form the flanges 30K when the walls 30H are spread out by the punch and die 21, 27. The original ends 30K of the extrusion 30H may be pressed upwardly to form the enlargements 30J.

Strippers may be provided wherever desired on punches and dies where they are not illustrated or described, as will be obvious, to remove the product from such respective punches and dies.

In FIGURES 13 and 14A a burnishing tool embodiment or operation different from that of FIGURES 14 and 15 is disclosed. The burnishing tools 40 of FIGURES 14 and 15 may be moved in the opposite direction in FIGURES 13 and 14A. The parts of the burnishing tools in FIGURES 13 and 14A corresponding to those of FIGURES 14 and 15 are designated by the same reference numerals with a prime (') added after such reference numerals.

Thus the tools 40' of FIGURES 13 and 14A have entering cylindrical constructions or pull rod constructions, not shown in FIGURES 13 and 14A, but similar to the entering constructions 42 shown in dotted lines in FIGURE 14. However, such entering constructions in FIGURES 13 and 14A are to be upwardly directed and are inserted in the unexpanded cylinder walls 26 of FIGURE 13. Likewise the tools 40' may have a series of burnishing bands 44' of increasing diameter, such as by $\frac{1}{10}$ inch increments gradually to expand the walls 26 from the full-line condition of FIGURE 13 to the final expanded condition 26A of FIGURES 13 and 14A. Likewise the tools 40' may expand the portions 46 of the crankshaft bearing support walls 48. This spreading action produces the new cylinder walls 26A in FIGURES 13 and 14A by movement of the burnishing tools 40' in a travel direction and taper different from that of the tools 40 in FIGURES 14 and 15. The last burnishing surface 52', FIGURE 13, may be of the same diameter as the wall 50'.

In FIGURES 13 and 14A, the cylinder and crankcase block may be inverted, if desired, so the walls 30 are above the walls 28, and then the burnishing tools 40' likewise may be inverted and may move downwardly when performing the burnishing operation. The block may be supported on a base during the burnishing operation.

FIGURE 21 shows an embodiment in which the cylinders 26F may be separately made of cast iron, or high silicon aluminum alloy or other suitable metallic substance, and may be swedged in place at 900° F. to form a metallurgical bond and mechanical lock with the sleeve 26K which sleeve 26K has been produced as previously described by extrusion as in FIGURES 7–11 with the punching action of FIGURE 12 and with the burnishing action of FIGURES 13, 14, 14A, and 15.

However, the sleeve 12K is made of sufficiently greater diameter than the piston receiving diameter so the sleeve 26F may be received therein to be metallurgically bonded and/or mechanically locked therein, in any desired manner.

For example, the sleeve 26F may be swedged and/or mechanically locked by a die operation in which the sleeve 26K is heat shrunk and bonded over the sleeve 26F by differential coefficient of thermal expansion and contraction.

In addition a slight taper or bulge 26J in sleeve 26F and corresponding cavity 26J' in sleeve 26K may be included between the sleeves 26F and 26K which is shown in exaggerated detail in FIGURE 21. Such bulge and cavity may first be made in the sleeve 26F and/or 26K before the sleeves are telescoped. The telescoping action may be accomplished by sufficiently differentially thermally expanding sleeve 26K with respect to sleeve 26F to receive and permit the telescoping action to take place with the bulge in sleeve 26F. Any other method and/or apparatus may be used to produce the bulge 26J and cavity 26J'.

The sleeces 26F may then be finished or ground after cooling in the usual manner.

FIGURE 19 shows an embodiment in which a "wet sleeve" 26L is inserted and press fitted in each opening 26M of the cylinder block 26M' which may be made substantially in the same manner as in FIGURES 1–12. However, the forming or extruding of the cylinders 26 in FIGURES 1–12 is omitted. Instead the wall 32 of FIGURE 8, for example, is not upwardly extruded to produce the sleeves 26, but is produced with a straight upper surface between the jacket walls 28. The thick band 102 of FIGURE 8 and the horizontal wall 32 of FIGURE 8 are then punched to produce the one or more openings 26M of FIGURE 19 to be surrounded by the thick band 102M of FIGURE 19.

The one or more sleeves 26L may be made of cast iron, high silicon aluminum alloy, or other suitable metallic substance, and may be provided with an abutment, such as flange 26N, which may engage the upper surface of band 102M.

Each sleeve 26L may be finished to desired trueness at the inner and outer surfaces 26P, 26Q, and 26R. The openings 26M also may be true finished.

If desired the one or more sleeves 26L may be press fitted in the opening 26M while the parts are at high temperature.

FIGURE 20 shows an embodiment in which a sleeve press fitting operation similar to that of FIGURE 19 is applied to an embodiment somewhat similar to that shown in FIGURE 18. The construction smilar to FIGURE 18 may be made without extruded sleeves 126, but may have the walls 130 and 128. The intermediate wall 132A of FIGURE 20, corresponding to 132 of FIGURE 18, is extruded or pressed into the thickened ring 132B which has one or more openings 132C, which may be trued to the desired degree. Then the one or more sleeves 26L', similar to sleeve 26L of FIGURE 19, may be "wet sleeve" press fitted into one or more openings 132 in a manner similar to that described in connection with FIGURE 19. Details of the sleeve L' are substantially identical to those of sleeve 26L and hence description thereof is not repeated.

Under certain conditions all of the cylinder blocks of this invention heretofore disclosed may be made with only the cooling jacket forming wall construction, a cylinder supporting transverse wall homogeneously connected with said cooling jacket construction and with a cylinder wall construction carried by such transverse wall, and with the crankcase wall construction omitted.

If desired, the cylinder blocks described in the preceding paragraph may each be secured or attached to a separate crankcase wall construction which may be separately made in any desired manner and then be secured or attached to the cylinder block.

If desired, such separate crankcase wall construction may otherwise be similar to the crankcase wall constructions herein disclosed.

It is thus to be seen that new and useful cylinder blocks and methods and apparatus for making the same have been provided by this invention.

While the form of the invention now preferred has been disclosed as required by the statutes, other forms may be used, all coming within the scope of the claims which follow.

What is claimed is:

1. A method of constructing an integral cylinder block which comprises compressing an extrudable mass, and extruding a cylinder wall construction and a cooling jacket wall construction from said compressed extrudable mass in one direction and a crankcase wall construction from said compressed extrudable mass in the opposite direction, and forming an intermediate wall from said mass having said cylinder wall construction and said cooling jacket wall construction on one side said intermediate wall and having said crankcase wall construction on the other side said intermediate wall, piercing said intermediate wall, and outwardly spreading said cylinder wall construction to produce a larger internal diameter cylinder construction.

2. A method according to claim 1 in which said crankcase wall construction is made wide enough for a crankshaft to rotate therein.

3. An integral cylinder block comprising extruded cylinder wall and cooling jacket wall constructions opening in one direction and an extruded crankcase wall construction opening in the opposite direction each of said constructions extruded from said opposite directions.

4. An integral cylinder block comprising extruded cylinder wall and cooling jacket wall constructions opening in one direction and extruded crankcase wall construction opening in the opposite direction with an intermediate wall having said cylinder wall construction and cooling jacket wall construction on one side of said intermediate wall and said crankcase wall construction on the other side of said intermediate wall each of said constructions extruded from said opposite directions.

5. An integral cylinder block comprising extruded cylinder wall and cooling jacket wall constructions opening in one direction and an extruded crankcase wall construction opening in the opposite direction each of said constructions extruded from said opposite directions said crankcase wall construction extending outwardly beyond said cooling jacket wall construction.

6. A method of constructing an integral cylinder block which comprises compressing an extrudable mass and simultaneously extruding a cylinder wall construction and a cooling jacket wall construction from said mass and thereafter outwardly spreading said cylinder wall construction to produce a larger internal diameter cylinder wall construction.

7. A method according to claim 6 in which a crankcase wall construction is simultaneously extruded adjacent said cylinder wall construction.

8. A method of constructing an integral cylinder block which comprises compressing an aluminous mass, and extruding cylinder and cooling jacket walls in one direction and crankcase walls in the opposite direction, with an integral intermediate wall with said cylinder and cooling jacket walls on one side and said crankcase walls on the other side said intermediate wall.

9. A method of constructing an integral cylinder block which comprises compressing an aluminous mass, and extruding cylinder and cooling jacket wall constructions with a transverse wall transverse to said cylinder and cooling jacket wall constructions.

10. A method comprising compressing an extrudable mass and extruding a cooling jacket wall construction in one direction, extruding a crankcase wall construction in the opposite direction and producing thereby a homogeneous cylinder supporting intermediate wall construction between and integral with said jacket wall construction and said crankcase wall construction.

11. A method according to claim 10 in which a cylinder wall construction is produced in said cooling jacket wall construction.

12. A method according to claim 11 in which said cylinder wall construction is extruded simultaneously with said cooling jacket wall construction.

13. A method according to claim 12 in which a cylinder lining construction is inserted in said cylinder wall construction.

14. A method according to claim 11 in which said cylinder wall construction is inserted in said cooling jacket wall construction after said cooling jacket wall construction is extruded.

15. A method according to claim 14 in which said cooling jacket wall construction and said crankcase wall construction are made of an aluminous metallic substance and said cylinder wall construction is made of a different metallic substance.

16. A method according to claim 12 in which said cooling jacket wall construction includes two parallel cooling jacket forming walls, and said cylinder wall construction includes a plurality of simultaneously extruded cylinders between said parallel cooling jacket forming walls.

17. A method according to claim 10 in which a cylinder receiving opening construction is pierced in said intermediate wall construction and a cylinder wall construction is inserted in said opening construction.

18. An integral block comprising an extruded cooling jacket wall construction extending in one direction, an extruded crankcase wall construction extending in the opposite direction each of said constructions extruded from said opposite directions, and a homogeneous cylinder supporting intermediate wall between said jacket wall construction and said crankcase wall construction.

19. A block according to claim 18 in which a cylinder wall construction is provided in said cooling jacket wall construction.

20. A block according to claim 19 in which said cylinder wall construction is an extruded wall homogeneously connected with said cooling jacket wall construction.

21. A block according to claim 20 in which a cylinder lining construction is an insert in said cylinder construction.

22. A block according to claim 19 in which said cylinder wall construction is an insert in said cooling jacket wall construction.

23. A block according to claim 22 in which said cooling jacket wall construction and said crankcase wall construction are made of an aluminous metallic substance and said cylinder wall construction is made of a different metallic substance.

24. A block according to claim 20 in which said cooling jacket wall construction includes two parallel cooling jacket forming walls, and said cylinder wall construction includes a plurality of simultaneously extruded cylinders between said parallel cooling jacket forming walls.

25. A block according to claim 18 in which a cylinder receiving opening is provided in said intermediate wall and a cylinder wall construction is an insert in said opening.

26. A method comprising compressing an extrudable mass and simultaneously extruding a cylinder wall construction and a cooling jacket wall construction and producing a cylinder supporting transverse wall homogeneously with said cooling jacket construction.

27. A method according to claim 26 in which a cylinder lining construction is inserted in said cylinder wall construction.

28. A method according to claim 26 in which said cooling jacket wall construction is extruded with two parallel cooling jacket forming walls, and said cylinder wall construction is extruded with a plurality of simultaneously extruded cylinders between said parallel cooling jacket forming walls.

29. An integral block comprising an extruded cylinder wall construction, an extruded cooling jacket wall construction and a cylinder supporting transverse wall homogeneously connected with said constructions.

30. A block according to claim 29 in which a cylinder lining construction is an insert in said cylinder wall construction.

31. A block according to claim 29 in which said cooling jacket wall construction includes two parallel cooling jacket forming walls and said cylinder wall construction includes a plurality of simultaneously extruded cylinders between said parallel cooling jacket forming walls.

References Cited by the Examiner

UNITED STATES PATENTS

| | | | |
|---|---|---|---|
| 1,133,531 | 3/1915 | Breath. | |
| 1,328,276 | 1/1920 | Fuchs | 29—156.4 |
| 1,386,007 | 8/1921 | Lynn | 29—156.4 |
| 2,382,303 | 8/1945 | Fawick | 29—156.4 |
| 2,424,075 | 7/1947 | Brauchler | 78—81 |
| 3,059,768 | 10/1962 | Altwicker et al. | 207—2 |

FOREIGN PATENTS

| | | |
|---|---|---|
| 315,779 | 2/1917 | Germany. |
| 863,363 | 3/1961 | Great Britain. |

MARK NEWMAN, *Primary Examiner.*

RICHARD B. WILKINSON, *Examiner.*

A. L. SMITH, *Assistant Examiner.*